Feb. 11, 1958  C. J. COBERLY  2,822,757
TWO-ZONE PUMPING SYSTEM AND METHOD
Filed March 7, 1955  5 Sheets-Sheet 2
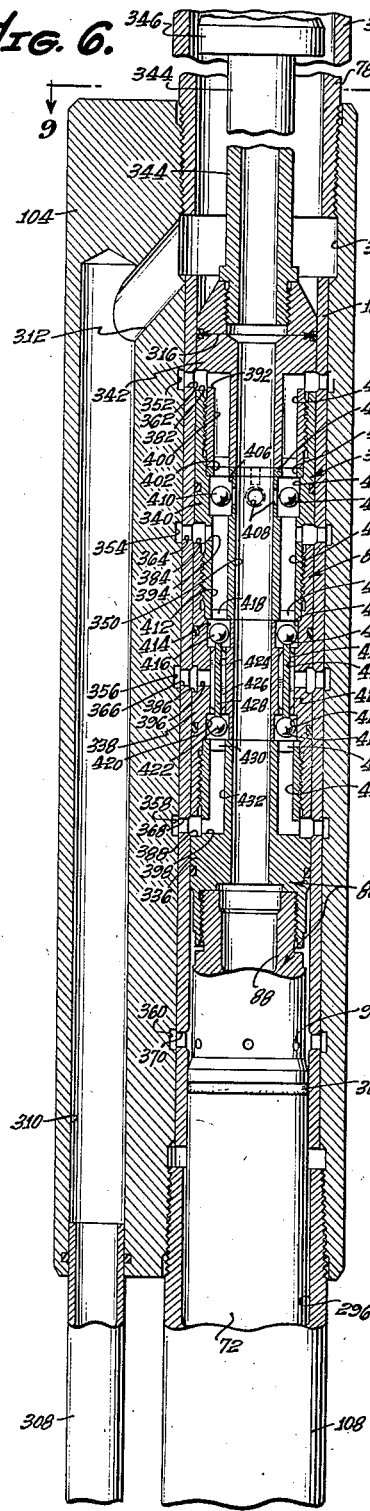
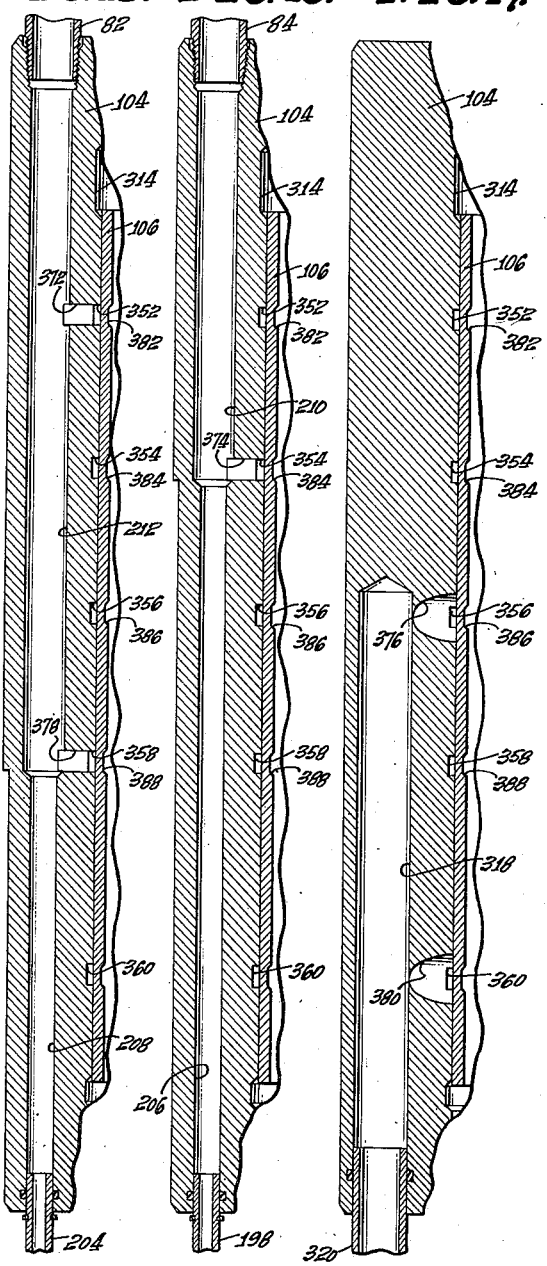
CLARENCE J. COBERLY,
INVENTOR.
By His Attorneys
HARRIS, KIECH, FOSTER & HARRIS.

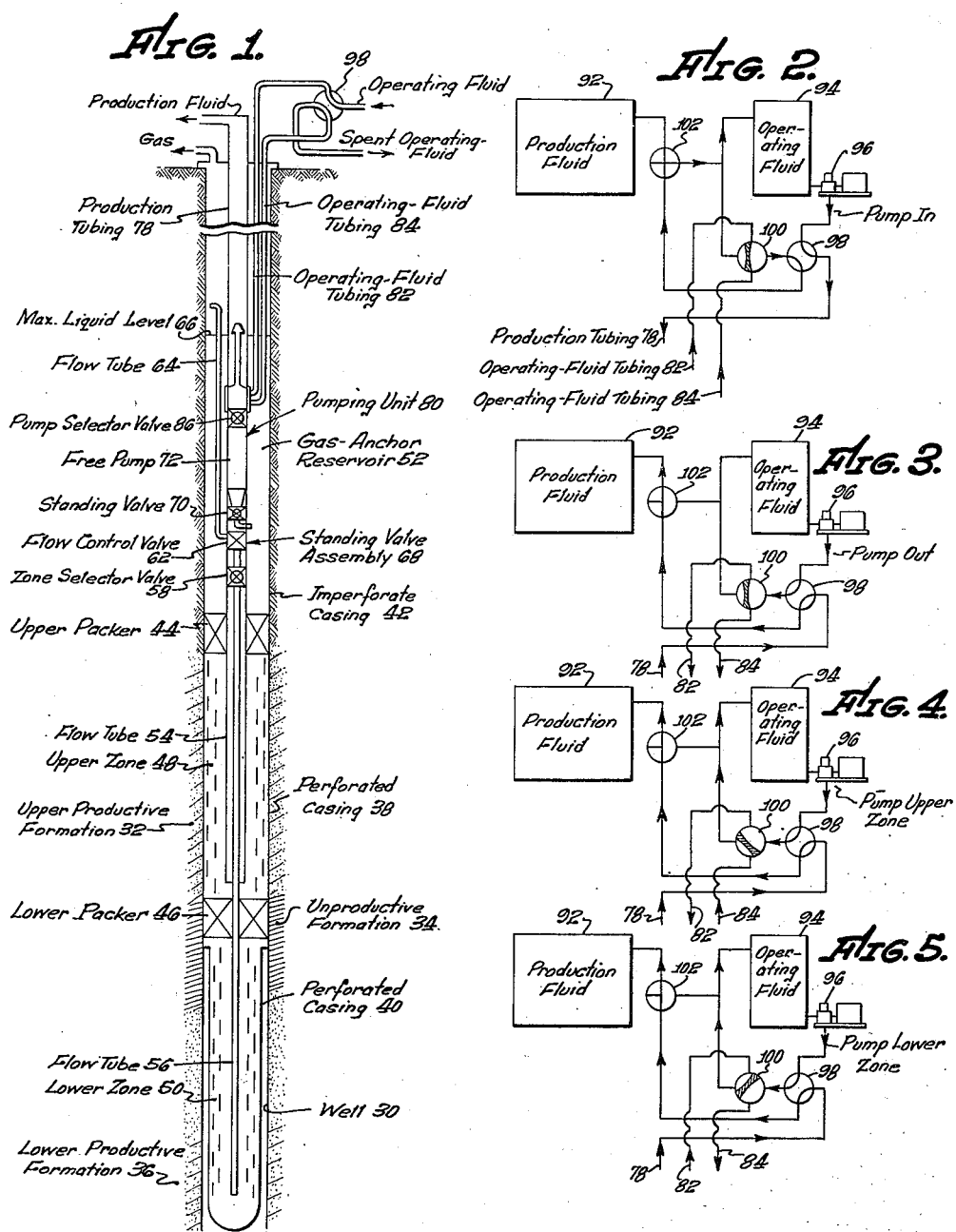

Feb. 11, 1958 C. J. COBERLY 2,822,757
TWO-ZONE PUMPING SYSTEM AND METHOD
Filed March 7, 1955 5 Sheets-Sheet 3
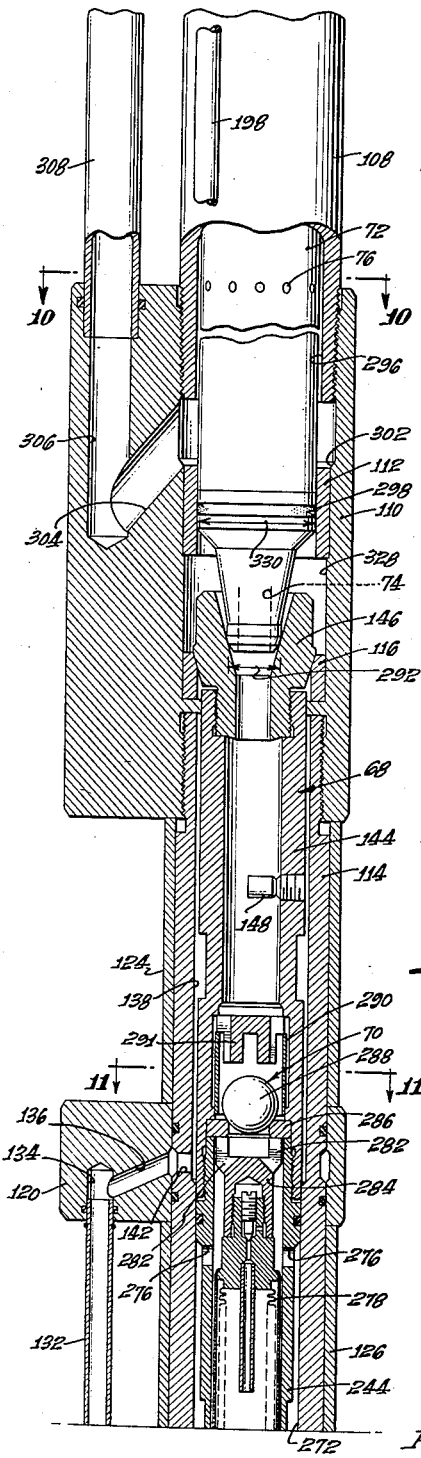
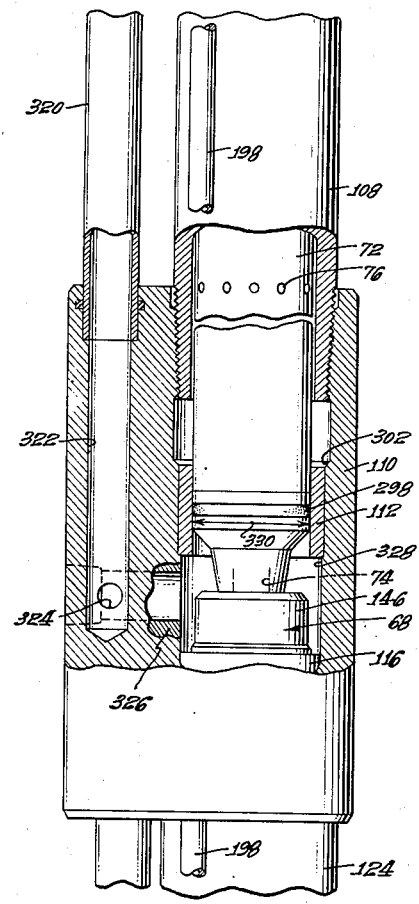
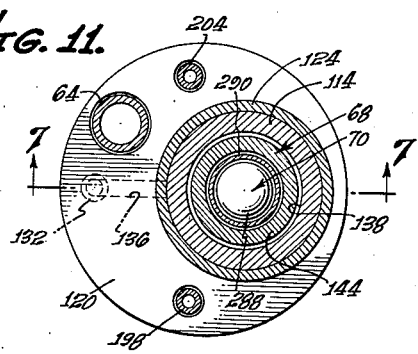
CLARENCE J. COBERLY,
INVENTOR.
By His Attorneys.
HARRIS, KIECH, FOSTER & HARRIS.

Feb. 11, 1958
C. J. COBERLY
2,822,757
TWO-ZONE PUMPING SYSTEM AND METHOD
Filed March 7, 1955
5 Sheets-Sheet 4
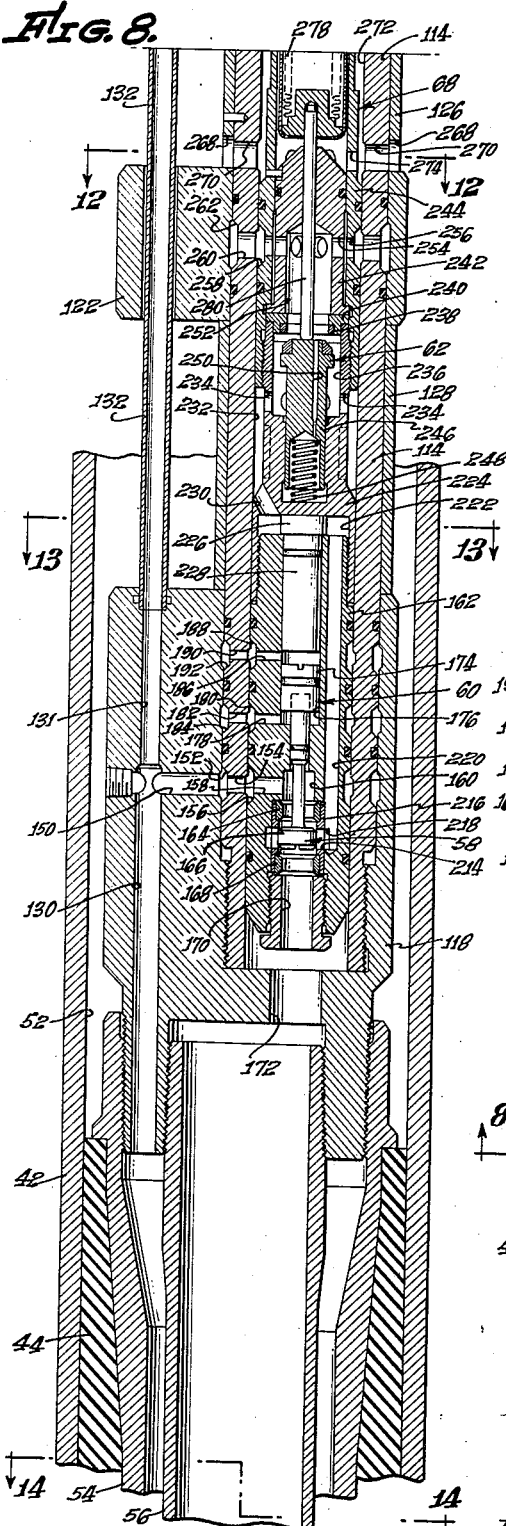
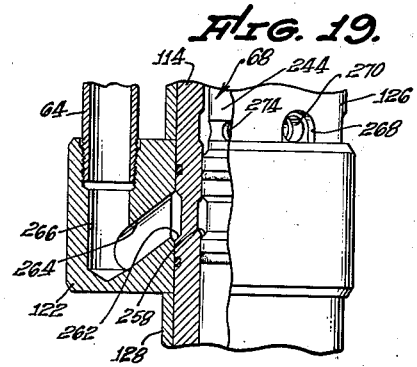
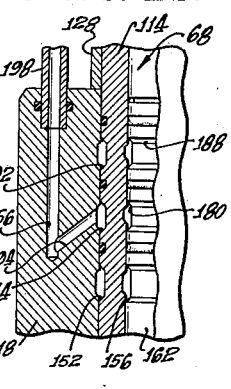
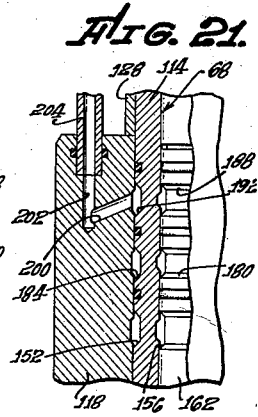
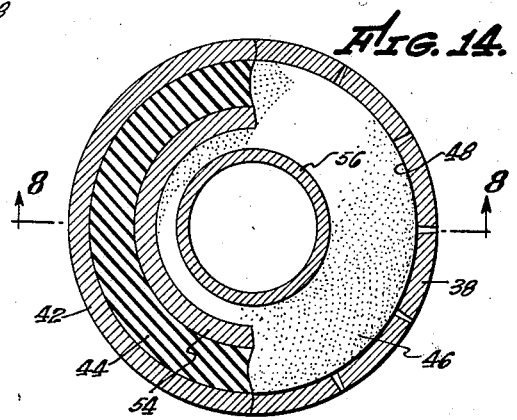
CLARENCE J. COBERLY,
INVENTOR.
By His Attorneys.
HARRIS, KIECH, FOSTER & HARRIS.

Feb. 11, 1958 — C. J. COBERLY — 2,822,757
TWO-ZONE PUMPING SYSTEM AND METHOD
Filed March 7, 1955 — 5 Sheets-Sheet 5

CLARENCE J. COBERLY,
INVENTOR.
By His Attorneys.
HARRIS, KIECH, FOSTER & HARRIS.

1

United States Patent Office 2,822,757
Patented Feb. 11, 1958

2,822,757

TWO-ZONE PUMPING SYSTEM AND METHOD

Clarence J. Coberly, San Marino, Calif., assignor to Kobe, Inc., Huntington Park, Calif., a corporation of California Application March 7, 1955, Serial No. 492,690

22 Claims. (Cl. 103—46)

The present invention relates in general to oil well pumping, and while the invention involves features which are applicable to single-zone pumping, it finds particular utility in the pumping of oil wells having more than one productive zone and will therefore be considered herein in connection with multi-zone pumping as a matter of convenience. Also, while various features involved in the invention are applicable to pumping more than two productive zones, the invention will be considered herein as applied to two-zone pumping for convenience.

In many oil fields, the wells extend through more than one productive formation, and substantial savings can frequently be realized if such wells are produced from different zones communicating with the respective productive formations, particularly where the productive formations are close together and are at substantial depths, and where the productive formations are relatively thin. Tapping two zones under such circumstances adds relatively little to the drilling and casing costs involved in tapping only one zone, but eliminates the duplication of casing and drilling costs necessary to tap the second zone separately. Thus, by tapping two productive zones with a single well, the effect of a second well is attained at the cost of drilling and casing the additional depth of hole and cementing between the two zones, this being small as compared to the cost of drilling and casing an independent second well.

However, despite the drilling and casing economies attainable with this technique, its application has been limited by various problems associated with producing oil and gas from two different zones with a single well. For example, it is desirable that the production from the two zones be maintained completely independent, both as to oil and gas production, and in many oil-producing areas this is a statutory requirement. The gas from the two zones cannot be produced satisfactorily by running the gas from one or both zones through a pump of the displacement type along with the oil therefrom since a pump of this type, to attain a reasonable volumetric efficiency, must operate on liquid only. Such a pump will operate satisfactorily on an oil-gas mixture only when all of the gas is in solution in the oil, or when the pressure in the productive formation is so high that the gas occupies only a very small part of the pump displacement. Unfortunately, these conditions are not present in most oil wells so that producing the gas through a pump of the displacement type along with the oil is unsatisfactory, it being impossible to deplete the lower zone in particular in this manner. While the use of fluid-operated pumps in oil well pumping is desirable for many reasons, another problem is presented if two such pumps are employed to pump the respective zones simultaneously. With two such pumps for the respective zones, each pump requires at least a supply tubing for operating fluid under pressure, a production tubing for the production fluid or oil and the spent operating fluid, and a production tubing for the gas. Consequently, six tubings are required for the two zones if the two systems are to be entirely independent, and five tubings are required if a common supply tubing for the operating fluid under pressure is utilized. Of course, if a closed system is desired to provide a separate return tubing for the spent operating fluid discharged by each pump in order to keep the operating fluid separate from the oil produced by the well, the number of tubings is further increased. If the fluid-operated pumps are of the so-called "free" type, three or four tubings must pass through the packer separating the upper and lower zones, depending upon whether an open system, or a closed system, is employed. As will be apparent, the number of tubings required with any system like the foregoing is so large as to permit the use of only small pumps having low capacities, keeping in mind that most oil wells are now cased with seven-inch casing, or smaller.

A general object of the present invention is to provide a two-zone pump and method which eliminate the foregoing and other problems presented by pumping from two zones, and which eliminate the foregoing and other disadvantages of two-zone pumping systems heretofore proposed.

More particularly, a primary object of the invention is to produce two zones with a single fluid-operated free pump having its operating position above the packer separating the two zones and pumping the two zones alternately. With such a system, only three tubings leading downwardly to the pump are required with a closed system, and only one tubing is required through the packer separating the two zones. With the number of tubings thus minimized, the single pump may be of large size having a capacity equal to or even greater than the sum of the capacities of two pumps of small size which must be used in systems of the nature hereinbefore discussed. Thus, the present invention provides a closed, free pump system requiring only one pump and minimizing the number of tubings, all without any sacrifice in pumping capacity.

Another important object is to maintain separation between the oil and gas produced by the two zones without running the gas from either zone through the pump so as to operate the pump at a high volumetric efficiency. In this connection, an object of the invention is to provide a gas anchor, preferably of the casing type, located immediately above the upper zone and adapted to separate substantially all of the gas produced by either zone from the oil produced thereby.

To accomplish the foregoing, the present invention provides a two-zone, closed, fluid-operated, free pump system which includes a production tubing and two operating-fluid tubings extending downwardly in the well to the operating position of the pump, the pump being movable between its operating position and the surface through the production tubing, which serves as the pump tubing. The operating position of the pump is within a gas-anchor reservoir wherein the gas and oil from either zone are separated prior to admitting the oil from such reservoir to the pump, the gas being produced through the casing. The reservoir is separated from the upper productive zone of the well by a packer, and another packer separates the lower productive zone from the upper, zone-selector valve means being provided to select the zone to be pumped. With the foregoing system, either zone may be produced completely independently without passing the gas from either zone through the pump, the provision of such a system being an important object of the invention.

Considering more specific objects of the invention, an important object thereof is to provide a pumping system wherein either of the two operating-fluid tubings mentioned may serve as a supply tubing for conveying operating fluid under pressure downwardly to the pump to operate same, the other operating-fluid tubing serving as a return tubing for spent operating fluid. A related object is to provide the pump with selector valve means, actuable by a fluid pressure differential between the two operating-fluid tubings, for regulating the flow of operating fluid under pressure into and the flow of spent operating fluid out of the pump in such a manner that the operating fluid flows through the pump in the same direction regardless of the direction of operating-fluid flow through the two operating-fluid tubings. Another object in this connection is to provide a pump selector-valve means of the foregoing nature which may be applied to a standard free pump to adapt it for the purpose.

Another object is to provide the selector-valve means for selecting the zone to be produced with a fluid-operated actuating means which is operable by a fluid pressure differential between the two operating-fluid tubings. Thus, by reversing the direction of flow of operating fluid through the two operating-fluid tubings, the zone-selector valve means is actuated to select a different zone for production, the pump itself being unaffected by such a reversal in the direction of operating-fluid flow because of the action of the pump selector-valve means hereinbefore discussed. Thus, in order to change zones, it is merely necessary to reverse the direction of operating-fluid flow, which is an important feature of the invention.

Another object is to provide a pumping system wherein the pump is unseated and moved upwardly through the production tubing by flowing operating fluid under pressure downwardly through both of the operating-fluid tubings simultaneously. A related object is to provide a pumping system wherein the pump is moved downwardly through the production tubing and seated in its operating position by supplying operating fluid to the production tubing, fluid displaced by the pump under such conditions returning through both of the operating-fluid tubings.

An important object of the invention is to provide flow-control valve means in series with the zone-selector valve means and between the latter and the gas-anchor reservoir for controlling the rate of flow of fluid from either zone into the reservoir. A related object is to provide such a flow-control valve means which is responsive to the liquid level in the reservoir so as to maintain the liquid level in the reservoir below a predetermined maximum level therein, the fluid from the selected zone being discharged into the reservoir above such maximum level to insure efficient gas-oil separation.

Another object is to provide a pumping system wherein the free pump is held seated in its operated position by the pressure of the production fluid column in the production tubing thereabove, a lower fluid pressure being applied below the pump to at least a part of the area thereof to enable the production column pressure to hold the pump seated in its operating position. Preferably, the pressure in the reservoir is applied to a downwardly facing area of the pump to enable the production column pressure to maintain the pump seated in its operating position, the reservoir pressure being maintained substantially constant at a value much less than the production column pressure by the flow-control valve means hereinbefore discussed.

Another object is to provide a standing valve assembly for the pump which includes a standing valve and which includes the zone-selector valve means and the flow-control valve means hereinbefore mentioned, this entire standing valve assembly being removable with a wire line, or the like, whenever necessary. With this construction, the oil and gas from either zone pass through the zone-selector valve means and the flow-control valve means incorporated in the standing valve assembly, the oil and gas from either zone then flowing into the reservoir, wherein gas-oil separation occurs. The oil from the selected zone then flows through the standing valve incorporated in the standing valve assembly into the pump by way of the inlet of the pump, the gas from the selected zone being drawn off through the casing. Thus, the standing valve, the flow-control valve means and the zone-selector valve means incorporated in the standing valve assembly serve either zone, which is an important feature.

Another object of the invention is to provide a pumping system for two zones which is a closed system comprising two relatively small, operating-fluid tubings and a relatively large production tubing to minimize production-fluid friction losses. A related object is to employ the relatively large production tubing as the pump tubing to permit the use of a relatively large pump having a substantial pumping capacity.

With the foregoing general construction, the pumping rate for each zone may be different, depending upon the productive capacity thereof, the zone having the higher productivity being pumped at a higher rate. Also, the production from the two zones may be controlled by a time program which divides the over-all production in any desired time proportions. Alternatively, production from the two zones may be controlled in such a manner as to produce the two zones for equal periods of time, but at different rates. Various other production programs are also possible with the present invention.

The foregoing objects, advantages and features of the present invention, together with various other objects, advantages and features thereof which will become apparent, may be attained with the exemplary embodiment of the invention which is illustrated in the accompanying drawings and which is described in detail hereinafter. Referring to the drawings:

Fig. 1 is a vertical sectional view of a well showing diagrammatically the pumping system of the invention installed therein;

Figs. 2, 3, 4 and 5 are diagrammatic views of a surface control system for regulating the operation of the pumping system of the invention, Fig. 2 showing the control system set to install a free pump in the well, Fig. 3 showing the control system set to remove the free pump from the well, Fig. 4 showing the control system set to pump from an upper zone of the well, and Fig. 5 showing the control system set to pump from a lower zone of the well;

Fig. 6 is a vertical sectional view of the upper end of the bottom hole installation of the pumping system of the invention;

Fig. 7 is a vertical sectional view of an intermediate portion of the bottom hole installation and is a downward continuation of Fig. 6;

Fig. 8 is a vertical sectional view of the lower end of the bottom hole installation and is a downward continuation of Fig. 7;

Figure 9:
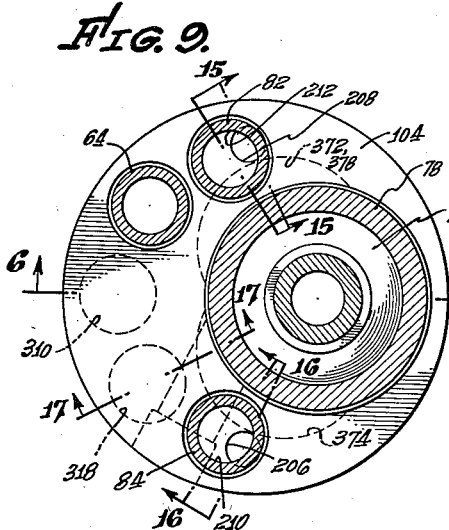
Fig. 9 is a horizontal sectional view taken along the arrowed line 9—9 of Fig. 6, Fig. 9 having indicated thereon by means of the arrowed line 6—6 the plane of the vertical sectional view constituting Fig. 6.
Figure 12:
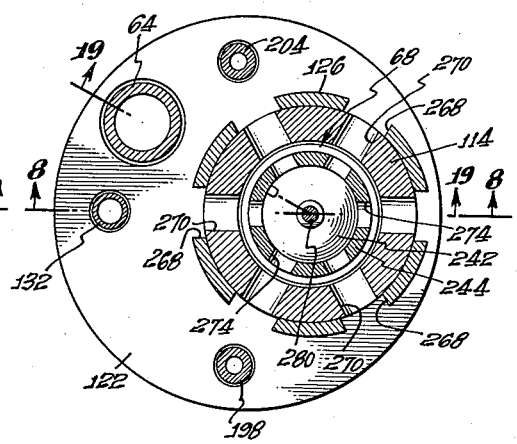
Figure 10:
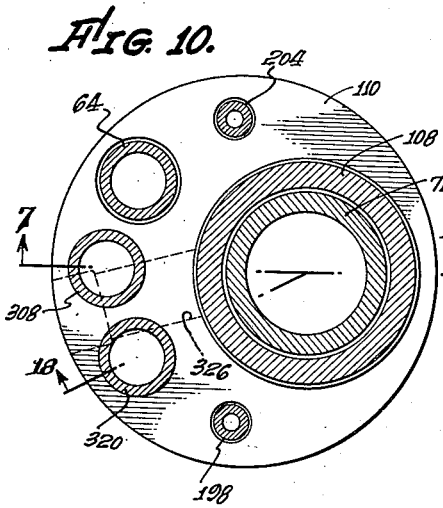
Figure 13:
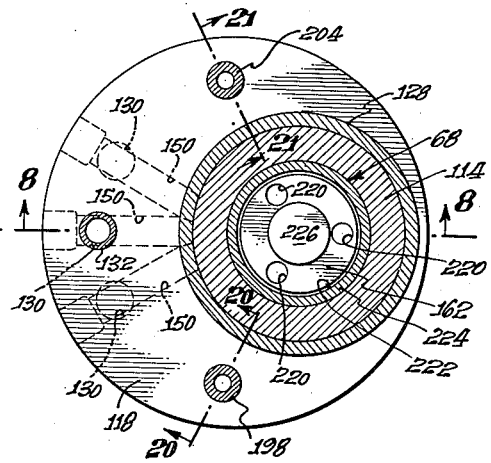

Figs. 10 and 11 are horizontal sectional views respectively taken along the arrowed lines 10—10 and 11—11 of Fig. 7, Figs. 10 and 11 having indicated thereon by means of the arrowed lines 7—7 the plane of the vertical sectional view constituting Fig. 7;

Figs. 12, 13 and 14 are horizontal sectional views respectively taken along the arrowed lines 12—12, 13—13 and 14—14 of Fig. 8, Figs. 12, 13 and 14 having indicated thereon by means of the arrowed lines 8—8 the plane of the vertical sectional view constituting Fig. 8;

Figs. 15, 16 and 17 are fragmentary vertical sectional views respectively taken along the arrowed lines 15—15, 16—16 and 17—17 of Fig. 9, and located at the same level as that portion of Fig. 6 opposite which they are located on the drawings;

Fig. 18 is a fragmentary vertical sectional view taken along the arrowed line 18—18 of Fig. 10, and located at the same level as that portion of Fig. 7 opposite which it is located on the drawings;

Fig. 19 is a fragmentary vertical sectional view taken along the arrowed line 19—19 of Fig. 12, and located at the same level as that portion of Fig. 8 opposite which it is located on the drawings; and Figs. 20 and 21 are fragmentary vertical sectional views respectively taken along the arrowed lines 20—20 and 21—21 of Fig. 13, and located at the same levels as that portion of Fig. 8 opposite which they are located on the drawings.

Referring first to Fig. 1, of the drawings, illustrated therein is a well 30 which extends through an upper productive formation 32, an unproductive formation 34 and into a lower productive formation 36. Perforated casings 38 and 40 are disposed in the well 30 opposite the productive formations 32 and 36, respectively, the well preferably being cemented off in the usual manner between the two productive formations to prevent communication between the two externally of the casings 38 and 40. Above the upper perforated casing 38 is an imperforate casing 42 which extends upwardly to the surface, where the usual well head, not shown, is provided.

Upper and lower packers 44 and 46 provide upper and lower productive zones 48 and 50 which communicate with the upper and lower productive formations 32 and 36, respectively, through the upper and lower perforated casings 38 and 40, respectively, the upper packer 44 being located at the junction of the perforated casing 38 and the imperforate casing 42, and the lower packer 46 being located between the perforated casings 38 and 40. Thus, the lower packer 46 separates the oil and gas entering the lower zone 50 from the oil and gas entering the upper zone 48, and the upper packer 44 separates the oil and gas entering the upper zone from the interior of the imperforate casing 42 thereabove.

The imperforate casing 42 above the upper packer 44 provides a reservoir 52 within which is located a casing-type gas anchor which may, for example, be similar to that disclosed in my Patent No. 2,674,192, and described hereinafter. From the reservoir 52, two flow tubes 54 and 56 extend downwardly through the upper packer 44, preferably in concentric relation. The flow tube 54 communicates at its lower end with the upper zone 48, while the flow tube 56 extends downwardly through the lower packer 46 and communicates at its lower end with the lower zone 50. Thus, oil and gas from the upper zone 48 can flow upwardly through the annulus between the flow tubes 54 and 56, and oil and gas from the lower zone 50 can flow upwardly through the flow tube 56. The flow tubes 54 and 56 are preferably relatively large so as to avoid imposing excessive back pressures on the zones 48 and 50 as the oil and gas therefrom flow upwardly to the casing-type gas anchor located immediately above the upper zone 48. For example, if the gas anchor is three-hundred feet above the lower zone 50, the back pressure on the lower zone can be kept to 30 p. s. i., which is not excessive for most conditions.

The flow tubes 54 and 56 communicate at their upper ends with a zone selector valve, or zone-selector-valve means, 58 which is actuable by a fluid-operated actuating means 60, Fig. 8, in a manner to be described. Oil and gas from the zone selected by the zone selector valve 58 flow through a flow control valve, or flow-control valve means, 62 into a flow tube 64 which discharges into the reservoir 52 above a predetermined maximum liquid level 66 therein. The flow control valve 62 is responsive to the liquid level in the reservoir 52 to keep the liquid level below the maximum 66, whereby oil-gas separation is attained as the oil-gas mixture from the selected zone is discharged into the reservoir above the maximum liquid level 66, as described generally hereinafter and as more fully described in my aforementioned Patent No. 2,674,192.

As discussed in more detail hereinafter, the zone selector valve 58 and the flow control valve 62 form part of a standing valve assembly 68 which includes a standing valve 70 communicating with the reservoir 52. Thus the standing valve 70 receives from the reservoir 52 liquid oil from which most of the gas has been separated in the manner hereinbefore discussed. The standing valve assembly 68 serves as a seat for a fluid-operated, free pump 72 and serves to admit fluid from the reservoir 52 to the inlet 74, Fig. 7, of such pump. The pump 72 may be of any suitable type, such as that disclosed in my Patent No. 2,311,157, but adapted for free pump operation. The fluid entering the pump 72 through the inlet 74 is discharged as production fluid through an outlet 76, Fig. 7, and is conveyed in a manner to be described to a point above the pump 72 into a relatively large production tubing 78 which conveys it to the surface. The pump 72 forms part of a free, pumping unit 80 which is disposed in the production tubing 78 and which is movable therethrough between the surface and an operating position wherein the pump 72 is seated on the standing valve assembly 68. The pumping unit 80 is moved between the surface and its operating position hydraulically in a manner to be described.

The well head, not shown, supports the production tubing 78 in the well, the production tubing, in turn, supporting all of the hereinbefore-mentioned components within the perforated casings 38 and 40 and the imperforate casing 42. Also supported by the well head are two relatively small, operating-fluid tubings 82 and 84 which interchangeably serve as supply and return tubings for conveying operating fluid under pressure downwardly to and spent operating fluid upwardly from the pump 72. Connected to the upper end of the pump 72 and forming part of the pumping unit 80 is a pump selector valve, or pump selector-valve means, 86 which is operable by a fluid pressure differential between the two operating-fluid tubings 82 and 84 to direct the operating fluid under pressure flowing downwardly through one such tubing into an intake 88, Fig. 6, of the pump, and to direct to the other such tubing the spent operating fluid exhausted by the pump through an exhaust 90, Fig. 6. Thus, irrespective of the direction of operating-fluid flow through the two operating-fluid tubings 82 and 84, the pump selector valve 86 responds to the resulting fluid pressure differential between the two operating-fluid tubings to deliver operating fluid under pressure to the intake 88 from the operating-fluid tubing which is serving as a supply tubing, and to deliver spent operating fluid from the exhaust 90 to the operating-fluid tubing which is serving as the return tubing.

As hereinafter discussed in more detail, the two operating-fluid tubings 82 and 84 are also connected to the fluid-operated actuating means 60 for the zone selector valve 58 so that one or the other of the zones 48 and 50 may be selected for production merely by reversing the operating-fluid flow through the operating-fluid tubings 82 and 84, the operation of the pump 72 being unaffected by such operating-fluid flow reversal because of the action of the pump selector valve 86, which are important features of the present invention.

The foregoing constitutes a general description of the structure of the pumping system of the invention and general indications of the mode of operation thereof. Before considering the structure of the pumping system of the invention in detail, the general mode of operation thereof will be outlined a little more completely with reference to Figs. 1 to 5 of the drawings. In Figs. 2 to 5 of the drawings are shown a reservoir 92 for production fluid storage, a reservoir 94 for operating fluid storage, a pump 96 for placing operating fluid from the reservoir 94 under pressure, and a system of control valves 98, 100 and 102 for interconnecting the reservoirs 92 and 94, the pump 96, the production tubing 78 and the two operating-fluid tubings 82 and 84 in various ways to be described. The reservoirs 92 and 94, the pump 96 and the control valves 98, 100 and 102 are all located on the surface at any convenient location.

Fig. 2 of the drawings shows the settings for the control valves 98, 100 and 102 required to run the pumping unit 80 downwardly through the production tubing 78 into its operating position wherein it is seated on the standing valve assembly 68. In other words, the selector valve 98 is set to deliver operating fluid from the pump 96 on the surface to the production tubing 78 to move the pumping unit 80 downwardly through the production tubing into its operating position. The control valves 100 and 102 are set to connect the two operating-fluid tubings 82 and 84 to the operating-fluid reservoir 94 so that the fluid displaced from the production tubing by the pumping unit flows upwardly through the operating-fluid tubings 82 and 84 into the operating fluid reservoir 94. It might be pointed out here that this procedure is followed only if the pumping unit 80 is being installed with the production tubing 78 filled with operating fluid from a previous removal of the pumping unit, or otherwise prefilled with operating fluid, so that the fluid in the tubings 78, 82 and 84 is clean and can be returned to the operating-fluid reservoir 94. If the fluid in the tubings 78, 82 and 84 is not fit for use as operating fluid, the selector valve 102 may be set to divert such unsuitable fluid into the production-fluid reservoir 92. Other procedures for purging the tubings 78, 82 and 84 of any fluid which is unsuitable for use as operating fluid for the pump 72 may be followed.

Fig. 3 of the drawings illustrates the settings of the control valves 98, 100 and 102 for removing the pumping unit 80 from the well for service, repair, or the like. Under such conditions, the control valves 98 and 100 are set to direct operating fluid under pressure from the surface pump 96 into both of the operating-fluid tubings 82 and 84, and the control valves 98 and 102 are set to connect the production tubing 78 to the production-fluid reservoir 92. Under such conditions, operating fluid under pressure flows downwardly through both of the operating-fluid tubings 82 and 84 to unseat the pumping unit 80 in a manner to be described, and to displace the pumping unit upwardly through the production tubing 78. The production fluid displaced from the production tubing 78 by the pumping unit 80 as it is moved upwardly in this manner flows through the control valves 98 and 102 into the production-fluid reservoir 92. With this procedure, mingling of the operating fluid and the production fluid is prevented during removal of the pumping unit 80.

With the control valves 98, 100 and 102 set as illustrated in Fig. 4 of the drawings, the production tubing 78 communicates with the production-fluid reservoir 92 through the valves 98 and 102, the operating-fluid tubing 82 communicates with the surface pump 96 through the control valves 98 and 100, and the operating-fluid tubing 84 communicates with the operating-fluid reservoir 94 through the control valve 100. Under such conditions, the zone selector valve 58 is actuated by the fluid-operated actuating means 60 to produce from the upper zone 48, as will be discussed in more detail hereinafter. In Fig. 5 of the drawings, the control valves 98, 100 and 102 are so set that the production tubing 78 is connected to the production-fluid reservoir 92 through the control valves 98 and 102, the operating-fluid tubing 84 is connected to the surface pump 96 through the control valves 98 and 100, and the operating fluid tubing 82 is connected to the operating-fluid reservoir 94 through the control valve 100. With these control-valve settings, the zone selector valve 58 is actuated by the fluid-operated actuating means 60 in a manner to be described to produce from the lower zone 50.

Thus, as will be apparent, the pumping unit 80 may be installed, or removed, or the pumping system may be operated to produce from either the upper zone 48 or the lower zone 50, all by suitably setting the control valves 98, 100 and 102, which is an important feature of the invention.

Considering the pumping system of the invention now in more detail, the production tubing 78, the operating-fluid tubing 82 and the operating-fluid tubing 84 are all connected at their lower ends to a sealing collar 104, as shown in Figs. 6, 15 and 16, respectively. The sealing collar 104 is provided with a liner 106 in alignment with the production tubing 78, this liner receiving the pump selector valve 86 and the upper end of the pump 72 when the pumping unit 80 is in its operating position, as will be discussed in more detail hereinafter. Threaded into the lower end of the sealing collar 104 in alignment with the liner 106 is a tube 108 which houses the intermediate portion of the pump 72 when the pumping unit 80 is in its operating position. The tube 108 is threaded at its lower end into a shoe 110, Fig. 7, provided with a liner 112 which receives the lower end of the pump 72 and which is aligned with the tube 108. Connected to the lower end of the shoe 110 in alignment with the liner 112 and the tube 108 is a tube 114 which houses the standing valve assembly 68, the latter being seated on a seat 116 carried by the shoe 110 and depending downwardly into the tube 114. The lower end of the tube 114 extends into and is threaded into a shoe 118, as shown in Fig. 8 of the drawings. Intermediate the shoe 110 and the shoe 118, the tube 114 passes through fittings 120 and 122, Figs. 7 and 8. The fitting 120 is spaced from the shoe 110 by a spacer 124, Fig. 7, which is telescoped over the tube 114. Similarly, the fittings 120 and 122 are spaced apart by a spacer 126 telescoped over the tube 114, and the fitting 122 is spaced from the shoe 118 by a spacer 128 telescoped over the tube 114. The spacers 124, 126 and 128 thus maintain the fittings 120 and 122 in predetermined positions relative to each other and relative to the shoes 110 and 118. Threaded onto the lower end of the shoe 118 is the flow tube 54 from the upper zone 48, this flow tube extending through the packer 44, as shown in Fig. 8. Threaded into the lower end of the shoe 118 concentric with the flow tube 54 is the flow tube 56 leading to the lower zone 50 of the well 30.

The annular space between the flow tubes 54 and 56 leading from the upper zone 48 communicates at its upper end with vertical passages 130, Figs. 8 and 13, in the shoe 118. One of the passages 130 communicates with a passage 131 through the shoe 118, the passage 131 communicating at its upper end with a tube 132 which, in turn, extends through the fitting 122, Fig. 8, and communicates at its upper end with a bore 134, Fig. 7, in the fitting 120. The bore 134 communicates with a passage 136 which, in turn, communicates with an annular space 138 between the standing valve assembly 68 and the tube 114 through an annular groove 140 and one or more radial ports 142. The annular space 138 surrounds a tube 144 which forms part of the standing valve assembly 68 and which is supported by a seat member 146 threaded thereinto and seated on the seat 116. The tube 144 has threaded therethrough a hollow knockout plug 148 adapted to be broken by a knockout bar, not shown, lowered into the tube 144 on a wire line, or the like, when it is desired to remove the standing valve assembly 68 from the well after having removed the pumping unit 80 therefrom. As will be apparent, when the knockout plug 148 is broken, any fluid above the standing valve assembly 68 will drain out through the broken knockout plug 148 into the annular space 138, and then downwardly into the upper zone 48 of the well through the ports 142, the groove 140, the passage 136, the bore 134, the tube 132, the passage 131, one of the passages 130, and the flow tube 54, to permit removal of the standing valve assembly from the well.

Referring to Fig. 8 of the drawings, communicating with the vertical passages 130 at their upper ends are transverse passages 150 in the shoe 118. These transverse passages communicate at their inner ends with an annular channel 152 which, in turn, communicates with one or more ports 154 through the tube 114. The ports 154 communicate with an annular channel 156 which, in turn, communicates with one or more ports 158, the latter communicating with a chamber 160. The channel 156, the ports 158 and the chamber 160 are formed in a housing 162 for the zone selector valve 58 and the actuating means 60 therefor, this housing forming the lower end of the standing valve assembly 68. The chamber 160 communicates at one end with an annular seat 164 for a valve element 166 of the zone selector valve 58. On the opposite side of the valve element 166 from the seat 164 is another annular seat 168 for this valve element, the seat 168 communicating through a passage 170 with the interior of the tube 114 at the lower end thereof. The flow tube 56 leading to the lower zone 50 of the well 30 communicates with the passage 170 through a port 172 in the shoe 118.

As will be apparent, when the valve element 166 is seated on the annular seat 164, the space between the seats 164 and 168 communicates with the lower zone 50 of the well through the annular seat 168, the passage 170, the port 172 and the flow tube 56. Conversely, when the valve element 166 is seated on the annular seat 168, the space between the seats 164 and 168 communicates with the upper zone 48 of the well through the seat 164, the chamber 160, the ports 158, the channel 156, the ports 154, the channel 152, the passages 150, the passages 130 and the flow tube 54. Thus, the zone selector valve 58 prevents communication between the upper and lower zones 48 and 50, only the selected zone communicating with the space between the seats 164 and 168. From the space between the annular seats 164 and 168, the oil and gas from the selected zone flow into the gas anchor reservoir 52 under the control of the flow control valve 62, as will be described in detail hereinafter.

Considering the actuating means 60 for the zone selector valve 58, this actuating means, as shown in Fig. 8 of the drawings, includes a piston 174 which is connected to the valve element 166 and which is movable in a cylinder 176 in the housing 162. Communicating with the lower end of the cylinder 176 are one or more ports 178 which, in turn, communicate with an annular channel 180 in the housing 162. The channel 180 registers with one or more ports 182 through the tube 114, the latter communicating with an annular channel 184 in this tube. Similarly, one or more ports 186 communicate with the upper end of the cylinder 176, these ports communicating with an annular channel 188 in the tube 114. Communicating with the channel 188 are one or more ports 190 through the tube 114, these ports communicating with an annular channel 192 in this tube. As shown in Fig. 20, communicating with the channel 184 is a transverse passage 194 in the shoe 118, this passage communicating with a vertical passage 196 which, in turn, communicates with a tube 198. Similarly, as shown in Fig. 21, communicating with the channel 192 is a passage 200 in the shoe 118, this passage communicating, in turn, with a passage 202 which communicates with a tube 204. As will be described in subsequent paragraphs the tubes 198 and 204 are connected to the operating-fluid tubings 84 and 82, respectively. Thus, when the flow through the operating-fluid tubings 82 and 84 is reversed in the manner hereinbefore discussed, the operating-fluid flow through the tubes 198 and 204 is reversed to move the piston 174 of the actuating means 60 in one direction or the other, thereby moving the valve element 166 of the zone selector valve 58 into engagement with one or the other of the seats 164 and 168 to select one or the other of the upper and lower zones 48 and 50.

Considering the manner in which the tubes 198 and 204 are connected to the operating-fluid tubings 84 and 82, respectively, the tubes 198 and 204 extend upwardly through the fitting 122, as shown in Fig. 12, through the fitting 120, as shown in Fig. 11, through the shoe 110, as shown in Fig. 10, and into the sealing collar 104, as shown in Figs. 16 and 15, respectively. The tubes 198 and 204 communicate at their upper ends with passages 206 and 208, respectively, in the sealing collar 104, the passages 206 and 208 communicating, in turn, with passages 210 and 212, respectively, in the sealing collar. The operating-fluid tubings 84 and 82 are threaded into the upper ends of the passages 210 and 212, respectively.

Thus, whenever the operating-fluid flow through the operating-fluid tubings 82 and 84 is reversed by means of the control valves 98 and 100 to reverse the fluid pressure differential between the two operating-fluid tubings, such reversal of the fluid pressure differential is transmitted downwardly to the piston 174 controlling the valve element 166 by the avenues just described, thereby reversing the position of the valve element 166 to reverse the zone selection existing previously. Consequently, either of the two well zones 48 and 50 may be selected for production merely by reversing the direction of operating-fluid flow through the operating-fluid tubings 82 and 84, which is an important feature of the invention.

Considering now the manner in which the production from the selected zone finds its way to the reservoir 52 through the flow control valve 62, and referring to Fig. 8 of the drawings, the space between the seats 164 and 168 for the valve element 166 communicates with ports 214 through a spacer 216 for the seats. The ports 214 communicate, in turn, with an annular channel 218 in the housing 162. This annular channel communicates with vertical passages 220 through the housing 162. The upper ends of the passages 220 communicate with a chamber 222 formed by threading the upper end of the housing 162 into the lower end of a valve housing 224. A head 226 on a closure 228 for the upper end of the cylinder 176 limits threaded insertion of the housing 162 into the valve housing 224 to form the chamber 222.

From the chamber 222, the production from the selected zone flows through one or more inclined ports 230 into an annular space 232 surrounding the valve housing 224 and between it and the tube 114. From the annular space 232, the production from the selected zone flows through ports 234 in the valve housing 224 into a chamber 236 in the valve housing. At one end of the chamber 236 is an annular valve seat 238, this valve seat being carried by a support 240 which, along with a fitting 242, is clamped between the valve housing 224 and a bellows housing 244. The valve housing 224 is threaded into the bellows housing 244, and the latter is threaded into the tube 144 mentioned previously, as shown in Fig. 7.

Adverting to Fig. 8 of the drawings, the valve housing 224 houses a valve element 246 forming part of the flow control valve 62, this valve element being adapted to seat on the seat 238 and being biased toward the seat by a compression spring 248. The valve element 246 is hydraulically balanced by virtue of a passage 250 therethrough. As will be discussed briefly hereinafter, and as more fully discussed in my aforementioned Patent No. 2,674,192, the flow control valve 62 regulates the flow into the reservoir 52 in such a manner as to maintain the liquid level therein below the maximum 66.

The oil and gas from the selected zone flowing past the valve element 246 enters a chamber 252 in the fitting 242 and, from this chamber, flows outwardly through registering ports 254 and 256 in the fitting 242 and the bellows housing 244, respectively, into an annular channel 258 in the bellows housing. From the annular channel 258, the selected production flows through ports 260 in the tube 114 into an annular channel 262 formed in the tube 114 and the fitting 122. Formed in the fitting 122 and communicating with the channel 262 is a transverse passage 264, Fig. 19, which communicates, in turn, with a vertical passage 266 in this fitting. Threaded into the fitting 122 in communication with the passage 266 is the lower end of the flow tube 64, this flow tube leading upwardly through the fitting 120, as shown in Fig. 11, through the shoe 110, as shown in Fig. 10, and through the sealing collar 104, as shown in Fig. 9. From the sealing collar 104, the flow tube 64 extends upwardly in the reservoir 52 and terminates above the maximum liquid level 66 therein. Thus, the production from the selected zone is discharged into the reservoir 52 above the maximum liquid level 66 therein to achieve efficient oil-gas separation, as more fully discussed in my aforementioned Patent No. 2,674,192. The gas separated from the selected production in this manner is drawn off at the top of the casing 42, as hereinbefore indicated.

The oil from the selected production including any water, dissolved gas, or other fluids present therein, flows from the reservoir 52 into the interior of the tube 114 through ports 268 and 270 formed in the spacer 126 and the tube 114, respectively, as shown in Figs. 8 and 12 of the drawings. Between the tube 114 and the bellows housing 244 is an annular space 272 which communicates with the interior of the bellows housing through ports 274 at the lower end of the space 272 and ports 276 at the upper end thereof, Fig. 7. Thus, oil from the selected zone entering the space 272 from the reservoir 52 enters the interior of the bellows housing 244 either through the ports 274, or the ports 276. Within the bellows housing 244 is a bellows 278 which thus responds to the pressure in the reservoir 52 at a point adjacent the lower end thereof. Thus, the bellows 278 responds to the liquid level in the reservoir, as more fully discussed in my aforementioned Patent No. 2,674,192. Connected to the lower end of the bellows 278 is a push rod 280 which passes through the fitting 242 and engages the valve element 246 so that the bellows controls the position of the valve element through the rod 280.

The operation of the bellows 278 in controlling the valve element 246 in response to liquid level variations in the reservoir 52 is fully described in my aforementioned Patent No. 2,674,192, and thus will be described only briefly herein. If the liquid level in the reservoir 52 tends to rise above the maximum 66, the bellows 278 collapses to permit the spring 248 to move the valve element 246 toward the seat 238. Thus, in the environment of the present invention, the rate of flow of fluid from the selected zone is reduced to prevent the liquid level in the reservoir 52 from exceeding the maximum 66. Conversely, if the liquid level in the reservoir 52 falls, the bellows 278 expands to move the valve element 246 away from the seat 238 in opposition to the action of the spring 248, thereby permitting an increase in the rate of flow of fluid from the selected zone into the reservoir 52 to maintain the desired liquid level in the reservoir. Thus, the flow control valve 62 maintains a substantially constant liquid level in the reservoir 52, and it does this regardless of which of the zones 48 and 50 is being produced since it is connected in series with the zone selector valve 58 downstream therefrom.

Continuing to consider the upward flow of liquid from the reservoir, and referring to Fig. 7 of the drawings, it flows from the interior of the bellows housing 244 through slots 282 in a support 284 for the bellows 278, this support being in contact with an annular seat 286 clamped between the bellows housing 244 and the tube 144. The seat 286 forms part of the standing valve 70, which includes a ball 288 adapted to engage the seat 286 and confined in a cage 290. As will be apparent, the ball 288 unseats to permit upward flow, but seats to prevent downward flow, being lightly held in its unseated position when the pump 72 is operating by a magnet 291 which releases the ball to permit it to seat upon application of sufficient pressure thereabove. The magnet 291 keeps the ball 288 from seating and unseating in response to small pressure fluctuations.

The fluid flowing upwardly through the standing valve 70 is conveyed by the tube 144 to the inlet 74 of the pump 72 which, as hereinbefore indicated, is seated on the seat member 146 when it is in its operating position. It will be noted that a downwardly facing area of the pump 72, indicated by the dimensional arrow 292, is always exposed to the pressure in the reservoir 52. As will be discussed in more detail hereinafter, this pressure is relatively low as compared to the pressures at the lower ends of the operating-fluid and production-fluid columns, and thus aids in maintaining the pump 72 on its seat 146. The pressure in the reservoir 52 may, of course, be controlled readily and maintained at the desired relatively low value by controlling the rate of withdrawal of gas from the zone being produced, at the upper end of the casing 42.

As will be described in more detail hereinafter, the pump 72 is operated by operating fluid under pressure supplied to its intake 88 through one of the operating-fluid tubings 82 and 84 and discharged from its exhaust 90 into the other of the operating-fluid tubings for return to the surface. As the pump 72 is operated in this manner, it draws in fluid from the reservoir 52 by the avenue hereinbefore outlined, and discharges such fluid as production fluid through its outlet 76, Figs. 7 and 18. The outlet 76, which may comprise a plurality of ports, communicates with an annular space 296 between the pump and the tube 108. This annular space is closed at its lower end by an O-ring 298 on the pump 72 and engaging the liner 112, and is closed at its upper end, Fig. 6, by an O-ring 300 on the pump and engaging the liner 106. At the lower end of the space 296 is an annular channel 302 in the shoe 110 which communicates with a transverse passage 304 therein, the passage 304 communicating, in turn, with a vertical passage 306 which communicates with the lower end of a production-fluid tube 308. Referring to Fig. 6 of the drawings, the upper end of the tube 308 communicates with the lower end of a vertical passage 310 in the sealing collar 104. The upper end of the passage 310 communicates with a transverse passage 312 which, in turn, communicates with an annular channel 314 in the sealing collar 104 at the lower end of the production tubing 78 above the pump selector valve 86. Thus, the production fluid discharged through the outlet 76 of the pump 72 by-passes the pump and the pump selector valve 86 and enters the production tubing thereabove, the production fluid being conveyed upwardly to the surface by the production tubing. As hereinbefore indicated, the production tubing 78 is relatively large to receive the pumping unit 80, and thus friction losses are minimized as the producing fluid flows upwardly to the surface. It will be noted that the pressure of the production fluid column in the production tubing 78 is applied to the entire area of the pumping unit 80, as indicated by the dimensional arrow 316 in Fig. 6 of the drawings. As hereinafter explained, the pressure of the production fluid column applied to such area of the pumping unit co-operates with other pressures applied thereto to keep the pump 72 seated on its seat 146.

Referring to Fig. 17 of the drawings, the sealing collar 104 is provided therein with a vertical passage 318, the fluid pressure in this passage being controlled by the pump selector valve 86 in a manner hereinafter explained, and being equal to the pressure of the spent operating fluid column while the pump 72 is in operation. The passage 318 communicates at its lower end with a tube 320 which, as shown in Fig. 18 of the drawings, communicates at its lower end with a vertical passage 322 in the shoe 110. The passage 322 communicates at its lower end, through passages 324 and 326 in the shoe 110, with a chamber 328, Figs. 7 and 18, at the lower end of the pump. Thus, when the pump 72 is in operation, the pressure of the spent operating fluid column present in the passage 318 under the control of the pump selector valve 86 is applied to a downwardly facing area of the pump 72 equal to the difference between the areas represented by the dimensional arrow 330 in Fig. 7 and the dimensional arrow 292 therein. As previously explained, the relatively low pressure in the reservoir 52 is applied to the downwardly facing area of the pump 72 represented by the dimensional arrow 292. Also as previously explained, the production column pressure is applied to an upwardly facing area of the pumping unit 80 represented by the dimensional arrow 316 of Fig. 6, the areas represented by the arrows 316 and 330 being substantially equal. Since the production column pressure and the spent operating fluid column pressure are substantially equal when the pump 72 is in operation, and since the reservoir pressure is substantially less than either of these, it will be apparent that these pressures, acting on the areas mentioned, cooperate to hold the pump 72 on its seat 146 while the pump is in operation. As will be explained hereinafter, the pump 72 may be unseated by increasing the pressure in the chamber 328 below the pump to a value sufficient to overcome the downward force differential resulting from the application of the production column pressure to the area represented by the arrow 316 and the application of the reservoir pressure to the area represented by the arrow 292.

Considering now the pump selector valve 86 with reference to Figs. 6, 15, 16 and 17 of the drawings, it includes a housing 334 made up of threadedly interconnected housing sections 336, 338, 340 and 342, the first of the series being threaded onto the upper end of the pump 72 and the last of the series having threaded thereinto a packer mandrel 344. The latter carries one or more downwardly facing packer cups 346 each disposed in an enlargement 348 of the production tubing 78 when the pumping unit 80 is in its operating position to permit the production fluid to flow around the packer cups. When the pumping unit 80 is being moved to the surface through the production tubing 78 by operating fluid under pressure supplied therebeneath, the packer cups make fluid-tight seals with the production tubing above the enlargements thereof.

Considering the pump selector valve 86 in more detail, the various housing sections 336, 338, 340 and 342 are tubular to provide the housing 334 with a central operating-fluid passage 350 communicating with the intake 88 of the pump 72. The passage 350 communicates at its upper end with the interior of the packer mandrel 344, which is tubular. The packer mandrel is closed at its upper end so as to prevent the escape of operating fluid from the upper end of the passage 350, the structure just described providing a condition of hydraulic balance with respect to operating fluid under pressure in the passage 350. The manner in which operating fluid under pressure is admitted to the central passage 350 will be described hereinafter.

The sealing collar 104 is provided with a series of annular channels 352, 354, 356, 358 and 360 which encircle the liner 106 and which communicate with the interior thereof through ports 362, 364, 366, 368 and 370, respectively. As shown in Fig. 15 of the drawings, the channels 352 and 358 respectively communicate with ports 372 and 378 leading to the passage 212 to which the operating-fluid tubing 82 is connected. As shown in Fig. 16, the channel 354 communicates through a port 374 with the passage 210 to which the operating-fluid tubing 84 is connected. As shown in Fig. 17, the sealing collar 104 is provided with ports 376 and 380 which respectively connect the channels 356 and 360 to the passage 318 to which the tube 320 leading to the bottom of the pump is connected. As best shown in Fig. 9 of the drawings, the ports 372, 374 and 378 have the form of arcuate grooves in the sealing collar 104 to minimize flow resistance. The ports 376 and 380 are also enlarged for the same purpose.

Spent operating fluid discharged by the pump 72 through its exhaust 90 enters the passage 318 through the ports 370, the annular channel 360 and the port 380. From the port 380, the spent operating fluid flows upwardly in the passage 318 to the port 376 during operation of the pump and enters the channel 356 and the ports 366 leading into the pump selector valve 86, as more fully described hereinafter. When the pump is in operation, the pressure of the spent operating fluid is also transmitted from the port 380 downwardly to the lower end of the pump as hereinbefore explained.

Respectively communicating with the inner ends of the ports 362, 364, 366 and 368 through the liner 106 are annular channels 382, 384, 386 and 388 formed in the liner and in corresponding sections of the housing 334. Communicating with the inner peripheries of the respective channels 382, 384, 386 and 388 are inwardly extending, radial ports 392, 394, 396 and 398 formed in corresponding sections of the housing 334.

The ports 392 communicate at their inner ends with vertical passages 400 in the housing section 342, the passages 400 communicating at their lower ends with ports 402 in a valve seat member 404 clamped between the housing sections 340 and 342. Below the ports 402 are ball chambers 406 which communicate with the passage 350 through ports 408 and which contain balls 410 adapted to seat on the seat member 404 to close the ports 402 therein for a purpose to be explained.

Below the ball chambers 406, which are formed in the housing section 340, are vertical passages 412 which communicate at their upper ends with the ball chambers 406 and which communicate intermediate their ends with the radial ports 394. The balls 410 are adapted to seat in the upper ends of the passage 412 to close same for a purpose to be described.

Below the passages 412 and communicating therewith are ball chambers 414 formed in the housing section 338 and containing balls 416. The lower ends of the passages 412 are relieved, as indicated at 418, to permit the balls 416 to engage the lower end of the housing section 340 without closing the lower ends of the passages 412. Also formed in the housing section 338 in alignment with, but spaced downwardly from, the ball chambers 414 are ball chambers 420 containing balls 422. The ball chambers 414 and 420 are connected by passages 424 which contain guides 426 for vertically movable ball spacers 428. The passages 424 communicate intermediate their ends with the radial ports 396, and the guides 426 permit fluid flow through the passages 424. The balls 416 are adapted to seat in the upper ends of the passages 424 to close same, and the balls 422 are adapted to seat in the lower ends of the passages 424 to close same. When the balls 416 are seated in the upper ends of the passages 424 to close same, the spacers 428 displace the balls 422 downwardly against the upper end of the housing section 336, which acts as a stop therefor. When the balls 422 are seated in the lower ends of the passages 424 to close same, the spacers 428 displace the balls 416 upwardly against the lower end of the housing section 340, which acts as a stop therefor. It will be noted that when the balls 416 engage the housing section 340, the reliefs 418 prevent closure of the lower ends of the passages 412. Similarly, when the balls 422 are in engagement with the upper ends of the housing section 336, reliefs 430 at the upper ends of passages 432 in the housing section 336 prevent the balls 422 from closing the passages 432. The latter communicate at their lower ends with the previously mentioned radial ports 398.

The foregoing completes the description of the structure of the pump selector valve 86. Its operation will be considered in connection with the following description of the over-all operation of the pumping system of the invention.

For convenience in considering the over-all operation of the pumping system of the invention, the operation thereof when producing from the upper zone 48 of the well 30 will be considered first. Under such conditions, the control valves 98, 100 and 102 are set as shown in Fig. 4 of the drawings, whereby operating fluid under pressure flows downwardly through the operating fluid tubing 82 and spent operating fluid flows upwardly through the operating-fluid tubing 84, production fluid being conveyed upwardly by the production tubing 78. Referring now to Figs. 6 and 15 of the drawings, with operating fluid under pressure in the tubing 82, such fluid enters the pump selector valve 86 through the passage 212, the port 372, the channel 352, the ports 362, the channel 382, the ports 392, the passages 400 and the ports 402, thereby moving the balls 410 downwardly and seating them in the upper ends of the passages 412 to close the latter. The operating fluid under pressure thus enters the passage 350 through the ports 408 and flows downwardly through the passage 350 into the pump 72 via its intake 88 to operate the pump in the usual manner. The pressure of the operating fluid supplied to the tubing 82 is transmitted through the passage 212, the port 378, the channel 358, the ports 368, the channel 388, the ports 398 and the passages 432 to the balls 422 to move them upwardly and seat them in the lower ends of the passages 424 to close same. Under such conditions, the spent operating fluid discharged by the pump through its exhaust 90 flows through the ports 370, the channel 360, the port 380, the passage 318, the port 376, the channel 356, the ports 366, the channel 386, the ports 396 and the passages 424, around the balls 416 by way of the reliefs 418, and through the passages 412, the ports 394, the channel 384, the ports 364, the channel 354, the port 374 and the passage 210 into the operating-fluid tubing 84, which serves as a return tubing for conveying the spent operating fluid to the surface. Under the foregoing conditions, the balls 422 are seated in the lower ends of the passages 424 by the operating fluid under pressure therebeneath to prevent mingling of the operating fluid under pressure and the spent operating fluid at this point. Also, the balls 410 are seated in the upper ends of the passages 412 to close same, thereby preventing mingling of the operating fluid under pressure and the spent operating fluid at this point. Under the foregoing conditions, the pressure of the spent operating fluid is also transmitted downwardly from the port 380 in the manner more fully discussed earlier and is applied to the downwardly facing area of the pump which is equal to the difference between the areas represented by the dimensional arrows 330 and 292, Fig. 7, the pressure in the reservoir 52 being applied to the downwardly facing area represented by the dimensional arrow 292, and the production column pressure being applied to the upwardly facing area represented by the dimensional arrow 316, Fig. 6, so that the combined effect of these pressures applied to the areas mentioned is to hold to pump 72 on its seat 146, as more fully explained earlier. Under the foregoing conditions, the operating fluid pressure present in the tubing 82 and the spent operating fluid pressure present in the tubing 84 are transmitted downwardly along the avenues hereinbefore discussed and are applied to the piston 174 of the actuating means 60 for the selector valve 58 to move the valve element 166 of the selector valve downwardly into engagement with the seat 168, thereby producing from the upper zone 48 of the well. The flow from the upper zone passes through the flow control valve 62 in the manner hereinbefore described, the flow control valve maintaining the liquid level in the reservoir 52 below the maximum 66 as more fully explained earlier. Thus, with the control valves 98, 100 and 102 set as shown in Fig. 4 of the drawings, the pump selector valve 86 automatically routes the operating fluid through the pump 72 in the proper manner, and the zone selector valve 58 automatically connects the upper zone 48 to the reservoir 52 through the flow control valve 62, which regulates the liquid level in the reservoir.

Considering now production from the lower zone 50, the control valves 98, 100 and 102 are set as illustrated in Fig. 5 of the drawings. Under such conditions, operating fluid under pressure is supplied to the tubing 84, the tubing 82 acting as the return tubing for spent operating fluid. Referring to Figs. 6 and 16 of the drawings, the operating fluid under pressure flowing downwardly through the tubing 84 flows through the passage 210, the port 374, the channels 354, the ports 364, the channel 384, the ports 394 and the passages 412 into the ball chambers 406 and 414, thereby seating the balls 410 in the ports 402 to close same and seating the balls 416 in the upper ends of the passages 424 to close same. From the ball chambers 406, the operating fluid under pressure flows through the ports 408 into the passage 350 leading to the operating-fluid intake 88 of the pump 72, thereby operating the pump in the usual manner. The spent operating fluid discharged by the pump through the exhaust 90 enters the passage 318, Fig. 17, through the ports 370, the channel 360 and the port 380 in the manner hereinbefore described. From the port 380, the spent operating fluid pressure is applied to the lower end of the pump 72 in the manner hereinbefore discussed. The spent operating fluid flows upwardly from the port 380 through the passage 318, the port 376, the channel 356, the ports 366, the channel 386, the ports 396, and the passages 424, around the balls 422 via the reliefs 430 and through the passages 432, the ports 398, the channel 388, the ports 368, the channel 358, the port 378 and the passage 212 into the operating-fluid tubing 82, which acts as the return tubing for returning the spent operating fluid to the surface. Under the foregoing conditions, the balls 416 are seated in the upper ends of the passages 424 to close same, thereby preventing mingling of the spent operating fluid and the operating fluid under pressure at this point. Also, the balls 410 are seated in the ports 402 to close same by the operating fluid under pressure, thereby preventing mingling of the spent operating fluid and the operating fluid under pressure at this point, spent operating fluid being present in the ports 402 above the balls 410 by virtue of the fluid communication with the passage 212 provided by the port 372, the channel 352, the ports 362, the channel 382, the ports 392, and the passages 400 leading to the ports 402. The operating fluid pressure in the tubing 84 and the spent operating fluid pressure in the tubing 82 are transmitted by the avenues hereinbefore described to opposite sides of the piston 174 of the actuating means 60 for the zone selector valve 58, whereby the valve element 166 of the zone selector valve is moved into seating relation with the seat 164 to produce from the lower zone 50. Again, the flow control valve 62, being in series with the zone selector valve 58 downstream therefrom, controls the rate of production from the lower zone into the reservoir 52 to maintain the liquid level in the rservoir below the predetermined maximum 66. Thus, when the control valves 98, 100 and 102 are set to produce the lower zone, the pump selector valve 86 automatically routes the operating fluid through the pump 72 in the proper manner, and automatically selects the lower zone for production at the same time. Regardless of whether the production is from the upper zone 48 or the lower zone 50, the flow control valve 62 regulates the rate of admission of fluid to the reservoir 52 to control the liquid level in the reservoir, so that the flow control valve serves both zones. Similarly, the standing valve 70 serves both zones.

When it is desired to remove the pumping unit 80 from the well for any reason, the control valves 98, 100 and 102 are set as illustrated in Fig. 3 of the drawings, thereby directing operating fluid under pressure down both the operating-fluid tubings 82 and 84, upward flow taking place through the production tubing 78. With both the tubings 82 and 84 pressurized, operating fluid under pressure from the tubing 82 will flow through the passage 212, the port 378, the channel 358, the ports 368, the channel 388, the ports 398 and the passages 432 into the ball chambers 420 to tend to seat the balls 422 in the lower ends of the passages 424. However, operating fluid under pressure from the tubing 84 flows through the passage 210, the port 374, the channel 354, the ports 364, the channel 384, the ports 394 and the passages 412 into the ball chambers 414 to tend to seat the balls 416 in the upper ends of the passages 424. Consequently, one or both sets of balls 416 and 422 will remain unseated with respect to the passages 424 so that operating fluid may flow through the passages 424, the ports 396, the channel 386, the ports 366, the channel 356, the port 376, the passage 318, the tube 320, the passage 322, and the passages 324 and 326 into the chamber 328 beneath the pump 72. The operating fluid under pressure thus delivered to the chamber 328 acts on the downwardly facing area of the pump which is equal to the difference between the areas represented by the dimensional arrows 330 and 292, thereby unseating the pump. The operating fluid under pressure also seats the ball 288 of the standing valve 70 in opposition to the action of the magnet 291. As soon as the pump is unseated, the operating fluid pressure is applied to the entire area of the pump, as represented by the dimensional arrow 330, to move the pump upwardly, upward leakage being prevented by the O-ring 298. By the time the O-ring 298 has moved upwardly sufficiently to register with the annular channel 302 communicating with the production tubing 78 through the passages 304 and 306, the flow tube 308, the passages 310 and 312, and the channel 314, the packer 346 has moved through the enlargement 348 of the production tubing and engages the inner wall of the production tubing to provide therewith a fluid-tight seal. Consequently, the operating fluid under pressure introduced below the pump continues to move the pumping unit 80 upwardly by acting on the packer 346, even though bypassing can take place from the annular channel 302 to the annular channel 314 by way of the passages 304 and 306, the flow tube 308, and the passages 310 and 312. Continued delivery of operating fluid under pressure below the pumping unit 80 in the manner hereinbefore discussed moves the unit upwardly through the production tubing 78 to the surface, the production fluid above the pumping unit being directed to the production-fluid reservoir 92 by the control valves 98 and 102, as shown in Fig. 3 of the drawings. It will be understood, of course, that the standing valve 70 prevents backflow into the reservoir during the pump removal operation.

If it is desired to remove the standing valve assembly for any reason after removal of the pumping unit 80 in the foregoing manner, this may be accomplished readily by means of a suitable tool, not shown, on a wire line. As previously explained, the knockout plug 148 is first broken to drain the system so that the standing valve assembly can be removed, such drainage being into the upper zone 48 by the avenue hereinbefore described.

To install the pumping unit 80, assuming that the standing valve assembly 68 has been installed previously, the control valves 98, 100 and 102 are set as shown in Fig. 2 of the drawings, the entire system having been prefilled with operating fluid, or being filled with operating fluid from a previous pump removal operation, so that the fluid displaced by installing the pumping unit can be routed to the operating-fluid reservoir 94 as shown. In order to install the pumping unit 80, it is merely necessary to supply operating fluid to the production tubing 78 thereabove, the fluid displaced by the pumping unit as it moves downwardly through the production tubing being returned to the operating-fluid reservoir 94 by the operating-fluid tubings 82 and 84 and the control valves 98, 100 and 102. As soon as the pumping unit 80 reaches its operating position wherein the pump 72 is seated on the seat 146, the pump may be operated to produce the upper zone 48 by setting the control valves 98, 100 and 102 as shown in Fig. 4 of the drawings, or it may be operated to produce the lower zone 50 by setting the control valves as illustrated in Fig. 5 of the drawings.

Thus, the present invention provides a pumping system capable of produicng two zones alternately with a single pump 72 having a pumping capacity at least equal to the combined pumping capacities of smaller pumps which would have to be used if the two zones were pumped independently, since the use of a single pump minimizes the number of tubings that must be run into the well and thus permits the use of a pump of larger size. With this construction, the relative pumping rates and pumping times for the two zones may be varied in accordance with any desired program, depending upon the relative productive capacities of the two zones. Either zone may be selected very readily simply by directing the operating-fluid flow through the operating-fluid tubings 82 and 84 in the proper direction, the resulting fluid pressure differential between the two operating-fluid tubings operating the actuating means 60 for the zone selector valve 58 to select the desired zone. Regardless of which way the operating fluid flows through the operating-fluid tubings 82 and 84, the pump selector valve 86 always routes the operating fluid under pressure from the tubing 82 or 84 which is being utilized as the supply tubing to the pump intake 88, and routes the spent operating fluid from the pump exhaust 90 to the tubing 82 or 84 which is serving as the return tubing for the spent operating fluid. Also, the operating fluid is separated from the produced fluid at all times to permit continuous reuse of the operating fluid. Regardless of which zone is being produced, the flow control valve 62 maintains a substantially constant liquid level in the reservoir 52, and the standing valve 70 serves either zone. By incorporating the zone selector valve 58, the flow control valve 62 and the standing valve 70 in the standing valve assembly 68, these components may be removed as a single unit whenever necessary. Regardless of which zone is being produced, both the oil and the gas therefrom are produced, passage of gas through the pump 72 being minimized by the oil-gas separation taking place in the reservoir 52. Thus, both zones may be depleted satisfactorily and the pump 72 will operate with a satisfactory volumetric efficiency. The productions from the two zones are maintained completely separate since the zone selector valve 58 prevents communication between the two zones, opening only one zone at a time to production. (Of course, some intermingling of gas and oil from the two zones takes place upon changing over from one zone to the other. However, the oil from the two zones which is intermingled in this manner amounts to only a few barrels, and the amount of gas which is intermingled amounts to only a few hundred cubic feet, which amounts are insignificant.) Whenever it is desired to remove the pumping unit 80 from the well for any reason, it is merely necessary to supply operating fluid to both of the operating-fluid tubings 82 and 84 to move the pumping unit to the surface through the production tubing 78. To install the pumping unit, this procedure is merely reversed, operating fluid being supplied to the production tubing 78 above the pumping unit and the fluid displaced by the pumping unit being returned through the operating-fluid tubings 82 and 84.

Although I have disclosed an exemplary embodiment of the invention herein for purposes of illustration, it will be understood that various changes, modifications and substitutions may be incorporated in such embodiment without departing from the spirit of the invention as defined by the claims which follow. Also, various features of the invention may be utilized in environments other than that herein disclosed without departing from the spirit of the invention.

I claim as my invention:

1. In a two-zone pumping system, the combination of: means providing upper and lower productive zones and a reservoir in a well; zone-selector valve means communicating with said zones and said reservoir and for selectively connecting said zones to said reservoir; and flow-control valve means in series with said zone-selector valve means and responsive to the liquid level in said reservoir for regulating the rate of flow from the selected zone to said reservoir.

2. In a two-zone pumping system, the combination of: two packers vertically spaced in a well and dividing it into upper and lower zones, respectively communicating with upper and lower productive formations, and a reservoir above said upper zone; zone-selector valve means communicating between said upper and lower zones and said reservoir for selectively connecting said zones to said reservoir; and flow-control valve means between and in series with said zone-selector valve means and said reservoir and responsive to the liquid level in said reservoir for regulating the rate of flow from the selected zone to said reservoir.

3. In a two-zone well pumping system, the combination of: means providing upper and lower zones in a well respectively communicating with upper and lower productive formations; means in the well for conveying fluid from a selected one of said zones upwardly to the surface; zone-selector valve means in the well for selectively connecting said zones to said conveying means; fluid-operated actuating means connected to said zone-selector valve means for actuating same; and means for conveying operating fluid under pressure downwardly in the well to said fluid-operated actuating means to operate same.

4. In a two-zone well pumping system, the combination of: means providing upper and lower zones in a well respectively communicating with upper and lower productive formations; pumping means in the well; means in the well for conveying fluid from a selected one of said zones upwardly from said pumping means to the surface; zone-selector valve means in the well for selectively connecting said zones to said pumping means; fluid-operated actuating means connected to said zone-selector valve means for actuating same; and means for conveying operating fluid under pressure downwardly in the well to said fluid-operated actuating means to operate same.

5. In a two-zone well pumping system, the combination of: pumping means for use in a well having different zones respectively communicating with different productive formations, said pumping means having an inlet; a single standing valve communicating with said inlet of said pumping means; and means for selectively connecting said zones to said standing valve.

6. In a closed, two-zone, fluid-operated pumping system, the combination of: a fluid-operated pump in a well having different zones respectively communicating with different productive formations, said pump having an inlet for well fluid, an outlet for production fluid, an intake for operating fluid under pressure, and an exhaust for spent operating fluid, a production tubing in the well and communicating with said outlet; two operating-fluid tubings in the well; means for connecting one of said operating-fluid tubings to said intake and the other to said exhaust; and zone-selector valve means for selectively connecting said zones to said inlet.

7. In a closed, two-zone, fluid-operated pumping system, the combination of: a fluid-operated pump in a well having different zones respectively communicating with different productive formations, said pump having an inlet for well fluid, an outlet for production fluid, an intake for operating fluid under pressure, and an exhaust for spent operating fluid; a production tubing in the well and communicating with said outlet; two operating-fluid tubings in the well; means for connecting one of said operating-fluid tubings to said intake and the other to said exhaust; zone-selector valve means for selectively connecting said zones to said inlet; and fluid-operated actuating means for said zone-selector valve means connected to said operating-fluid tubings.

8. In a closed, two-zone, fluid-operated, pumping system, the combination of: a fluid-operated pump in a well having different zones respectively communicating with different productive formations, said pump having an inlet for well fluid, an outlet for production fluid, an intake for operating fluid, and an exhaust for spent operating fluid; a production tubing in the well and connected to said outlet; two operating-fluid tubings in the well; pump selector-valve means for selectively connecting said operating-fluid tubings to said intake and said exhaust; control valve means for selectively connecting said operating-fluid tubings to a source of operatnig fluid under pressure and a point of disposal for spent operating fluid; and means connected to said operating-fluid tubings and operable by a fluid pressure differential therebetween for selectively connecting said zones to said inlet.

9. A closed, two-zone, fluid-operated, pumping system as defined in claim 8 wherein said pump is a free pump movable between an operating position in the well and the surface through one of said tubings.

10. In a closed, two-zone, fluid-operated pumping system, the combination of: a fluid-operated pump in a well having different zones respectively communicating with different productive formations, said pump having an inlet for well fluid, an outlet for production fluid, an intake for operating fluid, and an exhaust for spent operating fluid; a production tubing in the well and communicating with said outlet; two operating-fluid tubings in the well and selectively connectible to a source of operating fluid under pressure and a point of disposal for spent operating fluid, whereby operating fluid under pressure may flow downwardly in the well through either of said operating-fluid tubings, spent operating fluid flowing upwardly in the well through the other operating-fluid tubing; pump selector-valve means for connecting said intake to the operating-fluid tubing through which operating fluid under pressure is flowing downwardly in the well and for connecting said exhaust to the operating-fluid tubing through which spent operating fluid is flowing upwardly in the well; and means connected to said operating-fluid tubings and operable by a fluid pressure differential therebetween for selectively connecting said zones to said inlet.

11. In a fluid-operated well pumping system, the combination of: a fluid-operated pump in a well and having an intake for operating fluid under pressure and an exhaust for spent operating fluid; two operating-fluid tubings in the well and selectively connectible to a source of operating fluid under pressure and a point of disposal for spent operating fluid, whereby operating fluid under pressure flows downwardly through either of said operating-fluid tubings and spent operating fluid flows upwardly through the other of said operating-fluid tubings; and selector valve means for selectively connecting said intake and said exhaust to said operating fluid tubings in accordance with the direction of operating fluid flow therethrough.

12. In a fluid-operated well pumping system, the combination of: a fluid-operated pump in a well and having an intake for operating fluid under pressure and an exhaust for spent operating fluid; two operating-fluid tubings in the well and selectively connectible to a source of operating fluid under pressure and a point of disposal for spent operating fluid, whereby operating fluid under pressure flows downwardly through either of said operating-fluid tubings and spent operating fluid flows upwardly through the other of said operating-fluid tubings; and fluid-operated selector valve means responsive to a fluid pressure differential between said operating-fluid tubings for connecting said intake to the operating-fluid tubing which is connected to said source and for connecting said exhaust to the operating-fluid tubing which is connected to said point of disposal.

13. In combination: a fluid-operated pump in a well having an intake for operating fluid under pressure and an exhaust for spent operating fluid; two operating-fluid tubings in the well; means for selectively pressurizing said operating-fluid tubings to produce a fluid pressure differential therebetween; and selector valve means actuable by said fluid pressure differential for connecting said intake and said exhaust to the operating-fluid tubings of higher and lower pressures, respectively.

14. In a free, fluid-operated, well pumping system, the combination of: a free, fluid-operated pump in a well, said pump having an intake for operating fluid under pressure, an exhaust for spent operating fluid, and a downwardly-facing area; two interchangeable operating-fluid tubings in the well, one adapted to contain operating fluid under a higher pressure and the other spent operating fluid under a lower pressure; and selector valve means for connecting said intake to the operating-fluid tubing containing operating fluid under higher pressure and for connecting said exhaust and said area to the operating-fluid tubing containing spent operating fluid under lower pressure.

15. In a well pumping system, the combination of: a free pump in a well and having a downwardly facing area; two operating-fluid tubings in the well and respectively adapted to contain operating fluid at higher and lower pressures interchangeably; and selector valve means for connecting said area to the operating-fluid tubing containing operating fluid under lower pressure.

16. In a well pumping system, the combination of: a free pump in a well and having a downwardly facing area; two operating-fluid tubings in the well and respectively adapted to contain operating fluid at higher and lower pressures interchangeably; and fluid-operated selector valve means actuable by a fluid pressure differential between said operating-fluid tubings for connecting said area to the operating-fluid tubing containing operating fluid under lower pressure.

17. In a well pumping system, the combination of: a free pump in a well and having an upwardly facing area and two downwardly-facing areas; means providing in the well two operating-fluid columns of variable pressures; fluid-operated selector valve means actuable by the pressures of said operating-fluid columns for connecting one of said downwardly facing areas to the operating-fluid column of lower pressure; means for applying the pressure of the well fluid in the well to the other downwardly facing area; and means for applying fluid pressure to said upwardly facing area.

18. In a closed, two-zone, fluid-operated pumping system, the combination of: three parallel tubings in a well one of which is a relatively large production tubing and the others of which are relatively small operating-fluid tubings; a fluid-operated pump at the lower end of said production tubing, said pump having an inlet for well fluid, an outlet for production fluid communicating with said production tubing, an intake for operating fluid under pressure, and an exhaust for spent operating fluid; means for connecting said intake and said exhaust to said operating-fluid tubings; and means for selectively connecting said inlet to different zones of the well.

19. In a closed, two-zone, fluid-operated pumping system, the combination of: three parallel tubings in a well one of which is a relatively large production tubing and the others of which are relatively small operating-fluid tubings; a fluid operated pump at the lower end of said production tubing, said pump having an inlet for well fluid, an outlet for production fluid communicating with said production tubing, an intake for operating fluid under pressure, and an exhaust for spent operating fluid; fluid-operated pump-selector valve means actuable by a fluid pressure differential between said operating-fluid tubings for selectively connecting said intake and said exhaust to said operating-fluid tubings; and fluid-operated zone-selector valve means actuable by a fluid pressure differential between said operating-fluid tubings for selectively connecting different zones of the well to said inlet.

20. A pumping system as defined in claim 19 wherein said pump is a free pump movable through said production tubing between an operating position in the well and the surface.

21. In a well pumping system for use in a well having different productive zones, the combination of: fluid-operated pumping means; means for connecting said fluid-operated pumping means to different zones of the well selectively to pump each zone independently; means for conveying production fluid discharged by the pumping means upwardly in the well to the surface; means for conveying operating fluid under pressure downwardly to the pumping means to operate same; and means for conveying spent operating fluid upwardly in the well from the pumping means to the surface independently of the production fluid.

22. A standing valve assembly for a well pump in a two-zone well pumping system, including: a standing valve; zone-selector valve means in series with and upstream from said standing valve for selectively connecting different zones of a well to said standing valve; and flow-control valve means in series with and interposed between said zone-selector valve means and said standing valve for regulating the rate of flow from the selected zone to said standing valve.

References Cited in the file of this patent

UNITED STATES PATENTS

| | | |
|---|---|---|
| 2,304,303 | Ferguson | Dec. 8, 1942 |
| 2,499,356 | Coberly | Mar. 7, 1950 |
| 2,499,357 | Coberly | Mar. 7, 1950 |
| 2,499,849 | Coberly | Mar. 7, 1950 |
| 2,589,671 | Coberly | Mar. 18, 1952 |
| 2,780,171 | Heddy | Feb. 5, 1957 |